United States Patent
Pincemin (10) Patent No.: US 8,965,207 B2
(45) Date of Patent: Feb. 24, 2015

(54) METHOD AND DEVICE FOR INSERTING/EXTRACTING OPTICAL SUBBAND INTO MULTIBAND OPTICAL OFDM SIGNAL

(75) Inventor: Erwan Pincemin, Gommenec'h (FR)

(73) Assignee: Orange, Paris (FR)

( * ) Notice: Subject to any disclaimer, the term of this patent is extended or adjusted under 35 U.S.C. 154(b) by 175 days.

(21) Appl. No.: 13/635,726

(22) PCT Filed: Mar. 10, 2011

(86) PCT No.: PCT/FR2011/050487
§ 371 (c)(1),
(2), (4) Date: Sep. 18, 2012

(87) PCT Pub. No.: WO2011/114042
PCT Pub. Date: Sep. 22, 2011

(65) Prior Publication Data
US 2013/0011141 A1    Jan. 10, 2013

(30) Foreign Application Priority Data

Mar. 18, 2010  (FR) ..................................... 10 51955

(51) Int. Cl.
*H04J 14/02*      (2006.01)
*H04L 5/00*       (2006.01)
*H04L 27/26*      (2006.01)

(52) U.S. Cl.
CPC ......... *H04J 14/0298* (2013.01); *H04J 14/0204* (2013.01); *H04J 14/0209* (2013.01);
(Continued)

(58) Field of Classification Search
CPC ............... H04J 14/0213; H04J 14/212; H04J 14/204–14/205; H04J 14/298

USPC ................................................ 398/83–85, 76
See application file for complete search history.

(56) References Cited

U.S. PATENT DOCUMENTS 8,064,766 B2 * 11/2011 Wei et al. .................... 398/59
2006/0222366 A1 * 10/2006 Sugaya ....................... 398/79
(Continued)

FOREIGN PATENT DOCUMENTS

EP    1 492 260 A1    12/2004
EP    1 628 424 A2    2/2006
(Continued)

OTHER PUBLICATIONS

Takada et al., "5 GHz-spaced 4200-channel two-stage tandem demultiplexer for ultra-multi-wavelength light source using supercontinuum generation," Electronics Letters, vol. 38(12), pp. 572-573 (Jun. 6, 2002).

*Primary Examiner* — Leslie Pascal
(74) *Attorney, Agent, or Firm* — Drinker Biddle & Reath LLP (57) ABSTRACT

A device for inserting/extracting at least one optical subband into an optical channel consisting of a plurality of optical subbands. The device includes an extraction means that is capable of extracting a first optical subband belonging to the optical channel, a suppression means that is arranged so as to obtain a filtered optical channel from the optical channel wherein at least one second subband is suppressed, and a coupling means that is capable of inserting a replacement optical subband in place of the second subband in the filtered optical channel so as to obtain a modified optical channel. The device moreover relates to an optical insertion/extraction switcher, using one or more insertion/extraction devices, and to the corresponding insertion/extraction methods.

13 Claims, 7 Drawing Sheets

(52) U.S. Cl.
CPC .......... *H04J14/021* (2013.01); *H04J 14/0212* (2013.01); *H04J 14/0213* (2013.01); *H04L 5/0007* (2013.01); *H04L 27/2626* (2013.01); *H04L 27/2647* (2013.01); *H04L 27/2697* (2013.01)
USPC .............................................. 398/76; 398/83

(56) References Cited

U.S. PATENT DOCUMENTS

2007/0286605 A1    12/2007  Feuer et al.
2008/0138066 A1*  6/2008  Zhu et al. ........................ 398/39
2009/0047019 A1*  2/2009  Palacharla et al. .............. 398/59
2009/0220228 A1*  9/2009  Popovic .......................... 398/48
2011/0311216 A1*  12/2011  Inoue ................................ 398/1

FOREIGN PATENT DOCUMENTS

EP      1 744 477 A1    1/2007
EP      2 134 007 A1   12/2009

* cited by examiner

METHOD AND DEVICE FOR INSERTING/EXTRACTING OPTICAL SUBBAND INTO MULTIBAND OPTICAL OFDM SIGNAL

CROSS-REFERENCE TO RELATED APPLICATIONS

This application is the U.S. national phase of the International Patent Application No. PCT/FR2011/050487 filed Mar. 10, 2011, which claims the benefit of French Application No. 1051955 filed Mar. 18, 2010, the entire content of which is incorporated herein by reference.

FIELD

The invention relates to the field of devices for inserting/extracting optical signals in optical transmission networks.

BACKGROUND

In order to cope with the rise in bitrate of optical transmission systems, the limits of wavelength-multiplexing technology (WDM for Wavelength Division Multiplexing in English) have been regularly pushed back.

Over long distances, in order for the bitrate to be able to reach 100 Gbit/s per wavelength, or indeed go beyond this threshold, it is possible to multiplex components at 10 Gbit/s (using 10 GbEthernet technology) so as to obtain an ultra high-bitrate channel at 100 Gbit/s (using 100 GbEthernet technology).

The need to easily deaggregate or aggregate such components in a WDM channel during transmission becomes essential so as to allow a high degree of flexibility in ultra high-bitrate optical transport networks. This deaggregation is beneficial both in terms of cost and energy consumption only on condition that it is wholly optical.

The modulation formats that can be used initially at 100 Gbit/s are based on a single-carrier modulation technique (termed coherent QPSK) which is not well adapted to intra-channel optical switching.

It is also possible to use orthogonal frequency multiplexing (OFDM for Orthogonal Frequency Division Multiplexing in English). This type of multiplexing is a multi-carrier modulation technique which may be implemented using one or more subbands carrying the bitrate of the WDM channel.

Thus, on account of its multi-band approach, OFDM multiplexing is the ideal candidate for implementing intra-channel optical switching making it possible to easily deaggregate or aggregate, in the actual interior of a WDM channel, the independent OFDM subbands.

However, to our knowledge, no device currently exists which makes it possible to extract or to insert an optical subband from or into an optical channel composed of several multiplexed optical subbands.

SUMMARY

The object of the present invention is to remedy this drawback.

An object of the present invention is to propose a wholly optical switch architecture capable of deaggregating and of aggregating the subbands multiplexed in a signal, such as a multi-band OFDM signal for example.

Another object of the present invention is to propose a flexible wholly optical switch that can process any WDM channel so as deaggregate its constituent subbands, independently of its wavelength or of its bitrate.

Another object of the present invention is to propose a flexible wholly optical switch, that can process both upgoing and downgoing traffic.

The present invention proposes for this purpose a device for inserting/extracting at least one optical subband into/from an optical channel composed of a plurality of optical subbands, the device comprising extraction means able to extract a first optical subband belonging to the optical channel, deletion means devised so as to obtain a filtered optical channel on the basis of the optical channel in which at least one second subband is deleted and a coupling means able to insert a replacement optical subband in place of the second subband into the filtered optical channel so as to obtain a modified optical channel.

With such an insertion/extraction device, it is possible to extract or to replace subbands multiplexed in a signal without reverting to the electronic domain. Thus, the device comprises only passive hardware components, which by definition are very economical in terms of energy consumption, in contradistinction to electronic switching.

Advantageously, the insertion/extraction device furthermore comprises a duplication means able to duplicate the optical channel to a first duplication port connected to the extraction means and a second duplication port connected to the deletion means, the extraction means consisting of bandpass filtering means connected to the first duplication port so as to receive a first duplicated optical channel and devised so as to let through, to an extraction port, the first optical subband, and the deletion means consisting of bandstop filtering means connected to the second duplication port so as to receive a second duplicated optical channel and devised so as to filter the second subband in said second duplicated optical signal so as to obtain the filtered optical channel. It is thus possible to extract and to replace, simultaneously, subbands multiplexed in one and the same optical signal.

In an advantageous embodiment, the width of the spectral passband of the bandpass filtering means and/or of the spectral band rejected by the bandstop filtering means is adjustable. It is thus possible to adapt the insertion/extraction device to the bitrate of the optical subbands to be processed.

In particular, the width of the spectral passband of the bandpass filtering means and/or of the spectral band rejected by the bandstop filtering means may lie in an interval ranging from 7 GHz to 50 GHz. This frequency range makes it possible to accommodate equally well the processing of a single optical subband and the processing of an entire WDM channel. More precisely, the width of the spectral passband of the bandpass filtering means and/or of the spectral band rejected by the bandstop filtering means may lie in an interval ranging from 7 GHz to 10 GHz. This frequency range makes it possible to accommodate the processing of at least one optical subband. The insertion/extraction device is thus totally agnostic to the binary bitrate inserted and/or extracted.

In an advantageous embodiment, the central frequency of the spectral passband of the bandpass filtering means and/or of the spectral band rejected by the bandstop filtering means is tunable. The insertion/extraction device can then accommodate any optical subband, independently of its range of frequencies.

In a particular embodiment, the optical subbands of the optical channel comprise at least two orthogonally frequency-multiplexed optical signals.

In another particular embodiment, the device comprises a device management module, connected to the bandpass filtering means and to the bandstop filtering means, said device management module being devised so as to adjust the spectral passband of the bandpass filtering means and the spectral band rejected by the bandstop filtering means and to tune the central frequency of the spectral passband of the bandpass filtering means and of the spectral band rejected by the bandstop filtering means. This embodiment is particularly advantageous since it makes it possible to reconfigure the insertion/extraction device remotely.

The present invention is aimed moreover at an optical switch for inserting/extracting at least one optical subband belonging to at least one optical channel included in an optical signal comprising a plurality of wavelength-multiplexed optical channels, said optical switch comprising:
 a selection module able to select at least one optical channel comprising at least one optical subband to be extracted and/or to be replaced from among the multiplexed optical channels of the optical signal;
 at least one insertion/extraction device such as described hereinabove, connected to the selection module and devised so as to extract at least one optical subband of the selected optical channel and/or to provide a modified optical channel obtained on the basis of the selected optical channel into which at least one subband is inserted;
 substitution means, connected to the insertion/extraction device and devised so as to obtain a modified optical signal by replacement of the at least one selected optical channel by the at least one modified optical channel.

An optical switch such as this makes it possible to perform the insertion or the extraction of an optical subband situated belonging to a multiplexed optical channel situated within a plurality of wavelength-multiplexed optical channels.

Advantageously, the insertion/extraction optical switch furthermore comprises a duplication means devised so as to duplicate the optical signal on at least one first and one second output port, the first output port being connected to the selection module so as to provide it with a first duplicated optical signal and the second output gate being connected to the substitution means so as to provide them with a second duplicated optical signal, and the substitution means comprise a blocking module devised so as to receive the second duplicated optical signal and to provide as output a filtered optical signal in which the at least one selected optical channel is deleted and a coupling means devised so as to couple the filtered optical signal and the at least one modified optical channel in order to obtain the modified optical signal.

In an advantageous embodiment, the optical switch comprises a switch management module connected to the selection module and to the blocking module, this switch management module being devised so as to control the selection module and the blocking module so as respectively to select and delete the at least one optical channel. It is thus possible to reconfigure the optical switch remotely. Such a switch can thus be entirely remotely reconfigurable when the insertion/extraction devices filtering means, the selection module and the blocking module are configurable remotely by way of management modules. This makes it possible to limit the interventions of the personnel in charge of the maintenance of the optical switch.

In another particular embodiment in which the optical switch comprises a plurality of insertion/extraction devices such as described hereinabove, the selection module comprises a deaggregation unit devised so as to transmit a plurality of selected optical channels, each comprising at least one optical subband to be extracted and/or replaced, respectively to each of the insertion/extraction devices and an aggregation unit devised so as to aggregate the modified optical channels obtained respectively by each of the insertion/extraction devices into an aggregated optical signal transmitted to the substitution means. It is thus possible to extract and/or replace optical subbands situated in various wavelength-multiplexed optical channels.

The present invention is also aimed at a method of inserting/extracting at least one optical subband into/from an optical channel comprising a plurality of optical subbands, said method comprising:
 the extraction of at least one first optical subband from the optical channel;
 the obtaining of a filtered optical channel on the basis of the optical channel in which at least one second optical subband is deleted; and
 the insertion of at least one replacement optical subband into the filtered optical channel, as replacement for the second optical subband, so as to obtain a modified optical channel.

The present invention is aimed moreover at a method of inserting/extracting at least one optical subband into/from an optical signal comprising a plurality of wavelength-multiplexed optical channels, at least one of said optical channels comprising a plurality of optical subbands, said method comprising:
 the extraction of at least one of said optical channels comprising at least one optical subband to be extracted and/or to be replaced;
 the application of the insertion/extraction method described hereinabove to the extracted optical channel, so as to extract at least one first optical subband of the extracted optical channel and/or to obtain at least one modified optical channel on the basis of the extracted optical channel in which at least one replacement optical subband is inserted in place of at least one second optical subband;
 the obtaining of a modified optical signal on the basis of the optical signal in which the extracted optical channel is replaced with the modified optical channel.

It is thus possible to extract and/or to replace an optical subband belonging to a wavelength-multiplexed optical channel within one and the same optical signal.

In a particular embodiment, this insertion/extraction method comprises a prior duplication of the optical signal as at least one first and one second duplicated optical signal, the extraction of the optical channel being done on the basis of the first duplicated optical signal and the obtaining of the modified optical signal being done on the basis of the second duplicated optical signal, and the step of obtaining the modified optical signal comprises the obtaining of a filtered optical signal on the basis of the second duplicated optical signal in which the second optical subband is deleted and the aggregation of the filtered optical signal with the at least one modified optical channel in order to obtain the modified optical signal.

In an advantageous embodiment where a plurality of optical subbands included in a plurality of selected optical channels are to be extracted and/or replaced, the application of the insertion/extraction method hereinabove is performed for each of said selected optical channels so as to obtain a plurality of modified optical channels into which at least one replacement optical subband is inserted, the plurality of modified optical channels is aggregated as an aggregated optical signal before the obtaining of the modified optical signal and the aggregation step comprises the aggregation of the filtered optical signal with the aggregated optical signal in order to obtain the modified optical signal. It is thus possible to extract and/or to replace an optical subband belonging to several wavelength-multiplexed optical channels within one and the same optical signal.

BRIEF DESCRIPTION OF THE DRAWINGS

Other characteristics and advantages of the invention will become apparent on examining the detailed description hereinafter, and the appended drawings in which.

DETAILED DESCRIPTION

Figure 1:
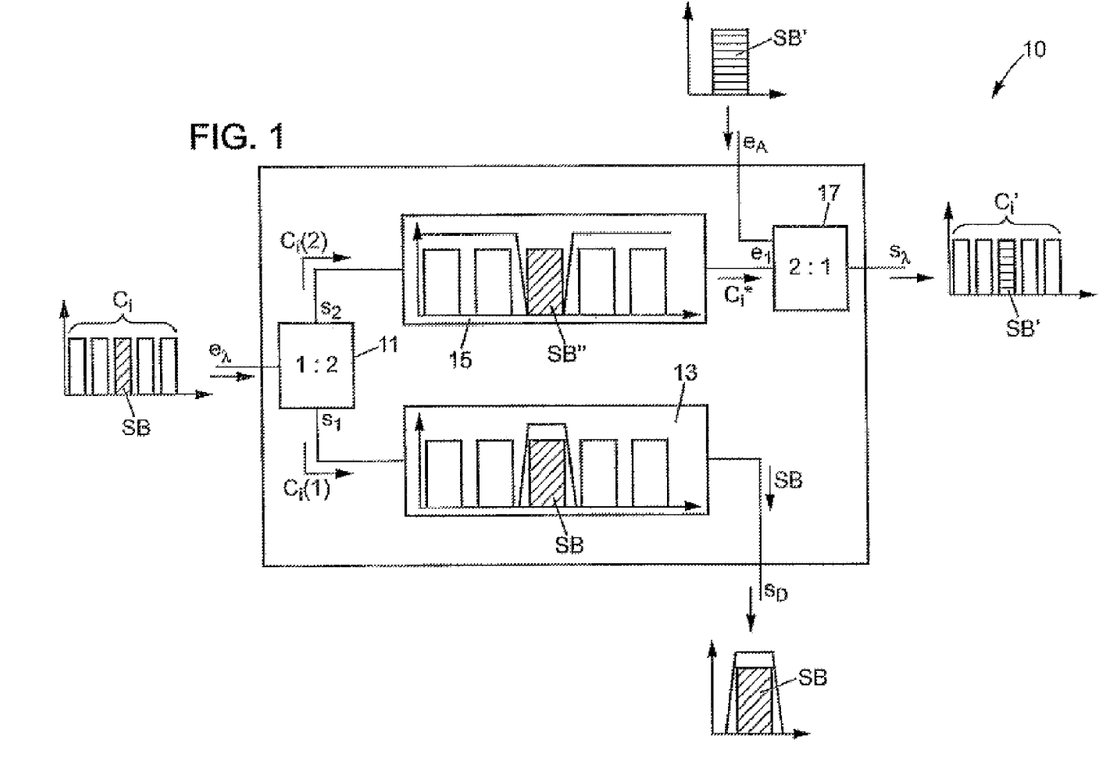
FIG. 1 schematically represents an insertion/extraction device according to a particular embodiment of the present invention.

Referring firstly to FIG. 1 in which is illustrated a device 10 for inserting/extracting an optical subband into/from an optical channel composed of a plurality of optical subbands. The term "optical subband" is understood here to mean an optical signal that is situated in a predetermined frequency band and that can be multiplexed with other similar "optical subbands" to form a multiplexed signal, for example frequency multiplexed by means of OFDM technology.

The term "optical channel" is understood here to mean an optical signal that is situated substantially at a predetermined wavelength and that can be wavelength multiplexed with other similar channels to form a wavelength-multiplexed signal.

Thus, in the context of the present invention, the optical channel $C_i$ considered is composed of a plurality of multiplexed optical subbands (purely by way of illustration, five in number in FIG. 1, but it is obvious that this optical channel can be composed of an arbitrary number of optical subbands), for example frequency multiplexed by means of OFDM technology.

Among these optical subbands there may be a first optical subband (denoted SB) intended to be extracted as well as a second optical subband (denoted SB") intended to be replaced with a replacement optical subband SB' situated substantially in the same frequency band.

The insertion/extraction device 10 thus serves equally well to extract the first optical subband SB and to replace the second optical subband SB" by the replacement optical subband within the optical channel $C_i$, or indeed to do these two operations simultaneously, and may advantageously be used within an optical node of an optical transmission network to extract and/or add data on optical signals.

The first optical subband SB and the second optical subband SB" can coincide substantially in the frequency domain, or indeed constitute a single optical subband SB intended to be at one and the same time extracted and replaced with a replacement subband SB'.

Accordingly, the insertion/extraction device 10 comprises extraction means 13 able to extract the first optical subband SB belonging to the optical channel $C_i$ deletion means 15 making it possible to obtain a filtered optical channel $C_i^*$, on the basis of the optical channel $C_i$ in which at least one second subband SB" is deleted and a coupling means 17 able to insert a replacement optical subband SB' in place of the second subband SB" into the filtered optical channel $C_i^*$, so as to obtain a modified optical channel $C_i'$.

The device 10 is thus capable, on the one hand, of extracting the first optical subband SB and, on the other hand, of replacing the second subband SB" by a replacement optical subband SB' which is thus inserted within the modified optical channel $C_i'$.

The insertion/extraction device 10 can furthermore comprise a duplication means 11, comprising an input port $e_\lambda$, a first duplication port $s_1$ connected to the extraction means 13 and a second duplication port $s_2$ connected to the deletion means 15.

The input port $e_\lambda$, corresponding to the main input port of the insertion/extraction device 10, serves to receive an optical channel $C_i$ composed of a plurality of optical subbands.

The duplication means 11 is able to duplicate the optical channel $C_i$ to the first duplication port $s_1$, in the form of a first duplicated signal $C_i(1)$, and to the second duplication port $s_2$, in the form of a second duplicated signal $C_i(2)$.

This duplication may be performed for example by dividing the optical channel received $C_i$ into two duplicated optical signals $C_i(1)$ and $C_i(2)$. In the case of a power division, the power of these duplicated channels is reduced with respect to the original channel C. The apportionment of the optical power of the optical input channel between the two duplicated signals $C_i(1)$ and $C_i(2)$ is advantageously of the order of 50/50, or may lie in an apportionment interval ranging from 50/50 to 45/55, so as to obtain two duplicated signals of globally similar power. The duplication means 11 can thus consist of a 50/50 coupler, or indeed a 55/45 coupler.

In one embodiment, the extraction means 13 of the device 10 can consist in particular of bandpass filtering means connected to the first duplication port $s_1$ of the duplication means 11, so as to receive one of the duplicated optical channels, in this instance the optical channel $C_i(1)$.

These filtering means 13 are devised so as to let through the first optical subband SB to be extracted to an extraction port $s_D$ corresponding to an output port of the insertion/extraction device 10. Accordingly, the filtering means 13 are "bandpass" and let through the optical frequencies situated in a predetermined spectral band while filtering the optical frequencies situated outside of this spectral band. In order to let through the first optical subband SB, it is therefore appropriate to choose the filtering means 13 so that their spectral passband contains the first optical subband SB.

Thus, by virtue of the filtering means 13, the extraction port $s_D$ delivers a filtered optical signal composed solely of the first optical subband SB, as illustrated in FIG. 1. These filtering means 13 therefore make it possible to extract the first optical subband SB of the optical channel $C_i(1)$.

In this embodiment, the deletion means 15 of the device 10 can consist in particular of bandstop filtering means 15 connected to the second duplication port $s_2$ of the duplication means 11, so as to receive another of the duplicated optical channels, in this instance the optical channel $C_i(2)$.

These filtering means 15 are devised so as to receive the duplicated optical channel $C_i(2)$ and provide as output a filtered optical channel $C_i^*$ obtained on the basis of this duplicated optical channel $C_i(2)$ (therefore on the basis of the input optical signal $C_i$) in which the second subband SB" is deleted by filtering.

Accordingly, the filtering means 15 are "bandstop" and block the optical frequencies situated in a predetermined spectral band while letting through the optical frequencies situated outside of this spectral band. In order to block the second optical subband SB", it is therefore appropriate to choose the filtering means 15 so that their blocking spectral band contains the second optical subband SB".

If the first optical subband SB and the second optical subband SB" coincide frequentially, the filtered optical channel $C_i^*$ obtained as output from the filtering means 15 is thus complementary to the filtered optical signal obtained as output from the filtering means 13, and these two filtered signals added together correspond to the optical input channel $C_i$.

The coupling means 17 exhibits for its part an input port $e_1$ connected to the output of the deletion means 15, as well as an insertion port $e_A$ and an output port $s_\lambda$.

The insertion port $e_A$ corresponds to an input port of the insertion/extraction device 10 and makes it possible to receive a replacement/insertion optical subband SB', such as illustrated in FIG. 1, so as to insert it into the optical channel $C_i^*$ filtered by the bandstop filtering means 15.

The output port $s_\lambda$ corresponds to the main output port of the insertion/extraction device 10 and serves to provide a modified optical signal $C_i'$ in which the subband SB" has been replaced with the subband SB', as illustrated in FIG. 1.

The coupling means 17 is therefore devised so as to couple the optical channel $C_i^*$ filtered by the bandstop filtering means 15 with the optical subband SB' inserted by virtue of the insertion port $e_A$, so as to obtain the modified optical signal $C_i'$ corresponding to the addition of these two signals and to provide this modified optical signal $C_i'$ as output, on the output port $s_\lambda$. Such a coupling means 17 can consist of a 50/50 coupler, or indeed a 55/45 coupler.

To simply illustrate the principle of the invention, the insertion/extraction device 10 of FIG. 1 is of degree 2, that is to say it allows only a single replacement subband insertion at a time. It is however entirely conceivable to construct an insertion/extraction device 10 of degree n, where n>2, in which case it is necessary that the duplication means 11 comprises n duplication ports to which bandstop filtering means similar to the filtering means 15 are respectively connected. Each filtered optical signal arising from one of these bandstop filtering means can then allow the insertion of a replacement subband, by virtue of a coupling means similar to the coupling means 17.

Similarly, FIG. 1 illustrates the case where a single optical subband is extracted and/or inserted. It is however entirely possible to extract and/or insert a number n' of optical subbands, where n'>1, according to the deaggregation need at the level of the optical node where the insertion/extraction device 10 is situated, in which case the spectral band blocked by the bandstop filtering means 15 must overlap the frequency bands covered by the n' subbands to be replaced.

If these n' optical subbands are essentially contiguous, it is for example possible to employ, for the filtering means 13, a single bandpass filter exhibiting a single spectral passband of sufficient width to cover the n' subbands to be replaced and, for the filtering means 15, a single bandstop filter exhibiting a single blocking spectral band of sufficient width to cover the n' subbands to be replaced.

In an advantageous embodiment, the width of the spectral passband of the bandpass filtering means 13 and/or of the spectral band rejected by the bandstop filtering means 15 is adjustable between a minimum value and a maximum value.

The adjustment of the width of the spectral band of the bandpass filtering means 13 and/or of the bandstop filtering means 15 may be carried out for example by way of a management module for the device (not illustrated in FIG. 1), connected to the bandpass filtering means 13 and to the bandstop filtering means 15.

In a first embodiment, this management module for the device may be integrated into the insertion/extraction device 10. However, in another embodiment, this management module for the device is positioned remotely from this device 10 and can control a plurality of devices 10. In this case, such a management module for the device can notably be in charge of the remote reconfiguration of a WDM transmission system integrating a plurality of devices 10 such as are described in the present patent application.

It is thus possible to remotely control the number of optical subbands having to be inserted or extracted by the device(s) 10, and therefore to remotely reconfigure this(these) device(s) as a function of the bitrate passing through it(them). In the latter advantageous embodiment, the fact of being able to adapt the spectral bands filtered in the insertion/extraction device 10 makes it possible to adapt this device to any type of bitrate. Such a device is then considered to be "bitrate agnostic".

The minimum value of spectral bandwidth may be of the order of 7 to 10 GHz, for example, to extract a single subband of OFDM type, in which case the traffic extracted is then likewise minimal in terms of bitrate. The maximum value of width of the spectral band of the filtering means 13 and 15 may be of the order of 50 GHz, this corresponding to a conventional spectral spacing between WDM channels. With such a maximum width of spectral band, the entirety of the optical channel $C_i$ is then extracted and/or replaced.

Preferably, the bitrate of the subband(s) added by the insertion port $e_A$ is less than or equal to the bitrate of the subband(s) deleted by the deletion means 15. It can thus be envisaged not to entirely replace the capacity deleted (and potentially extracted), by inserting a smaller number of subbands than the number of subbands deleted/extracted or by inserting subbands of smaller spectral width than the subbands deleted/extracted.

In another advantageous embodiment, the central frequency of the spectral passband of the bandpass filtering means 13 and/or of the spectral band rejected by the bandstop filtering means 15 is tunable, for example by way of the management module for the device such as described hereinabove, thereby allowing remote management of the device 10.

It is thus possible to extract and/or replace optical subbands situated at different optical frequencies by shifting the passing and filtering spectral bands so that they substantially cover these optical subbands.

In the latter advantageous embodiment, the operation of the insertion/extraction device 10 is no longer dependent on a certain range of frequencies. The insertion/extraction device 10 is then said to be colorless.

In a particular embodiment of the invention, the spectral passband of the bandpass filtering means 13 coincides substantially with the spectral band filtered by the bandstop filtering means 15. This mode is particularly adapted to the case where the first spectral band SB to be extracted coincides frequentially with the second spectral band SB" to be replaced. These two spectral bands may be set in coincidence by the management module for the device described hereinabove, thereby making it possible to perform the replacement of an optical subband by virtue of the insertion/extraction device 10.

Advantageously, the filtering means 13 and 15 exhibit an essentially square profile ("square flat-top"), so as to optimize the selectivity of the subbands to be inserted and extracted.

With the characteristics hereinabove, it is possible to have a node whose capacity for aggregation and/or deaggregation is flexible. The optical node having such an insertion/extraction device 10 can therefore be adapted to the bitrate tapped off or added.

In a particular embodiment, the optical channel $C_i$ is composed of optical subbands that are orthogonally frequency-multiplexed, for example with the aid of OFDM technology. The principle of the present invention can however be applied to other types of optical channels comprising optical subbands multiplexed by means of another technology.

Figure 2:
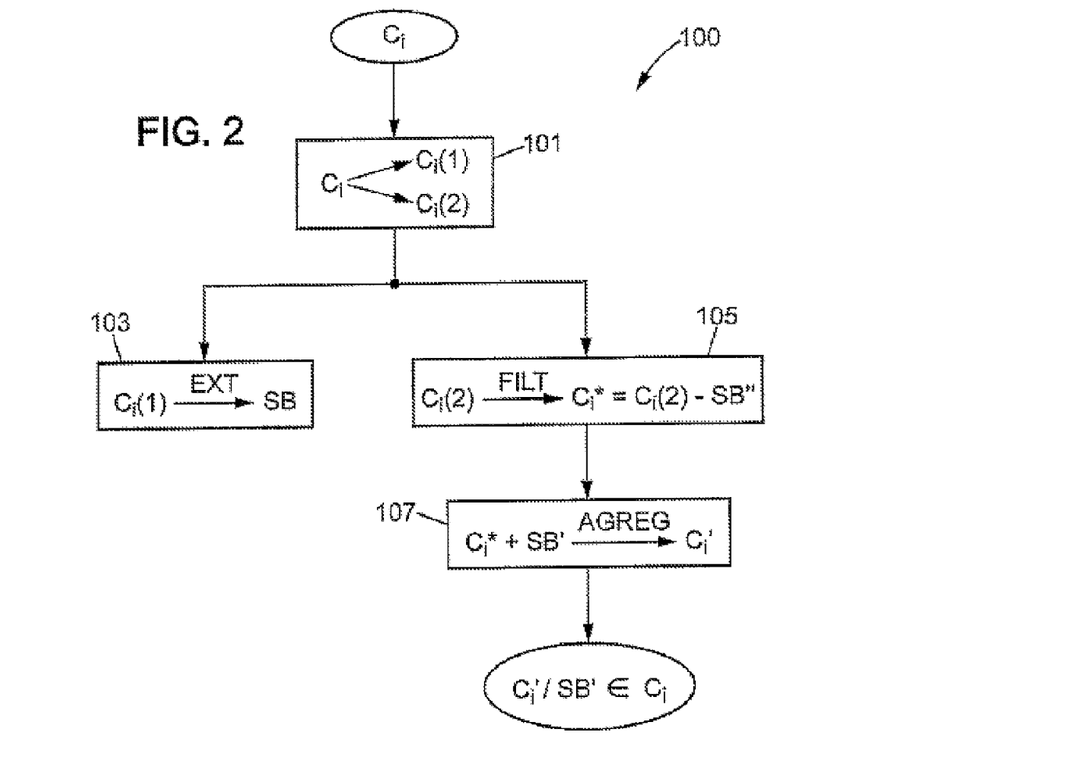
FIG. 2 illustrates the steps of a method of inserting/extracting at least one optical subband into/from an optical channel according to a particular embodiment of the present invention.

Referring now to FIG. 2 in which are illustrated the steps of a method 100 for replacing an optical subband in an optical channel according to the present invention, it being possible for these steps to be advantageously performed by means of the insertion/extraction device 10 of FIG. 1.

Here again, the replacement method 100 is applied to the replacement of an optical subband SB in an optical channel $C_i$ comprising a plurality of optical subbands, for example frequency multiplexed according to the OFDM technique.

The method 100 comprises, on the one hand, a step 103 of extracting a first optical subband SB to be extracted from the optical channel $C_i$.

This extraction step 103 advantageously comprises the bandpass filtering of the optical subband SB to be extracted, which may be performed with the aid of means similar to the bandpass filtering means 13 described previously, which can consist of a tunable bandpass filtering for example.

The method 100 comprises, on the other hand, a step 105 of obtaining a filtered optical channel $C_i^*$, on the basis of the optical channel $C_i$ in which a second optical subband SB" to be replaced is deleted.

This obtaining step 105 advantageously comprises the bandstop filtering of the optical subband SB" to be replaced, with the aid of means similar to the bandstop filtering means 15 described previously, which can consist of a tunable bandpass filtering for example.

Once the filtered optical channel $C_i^*$ has been obtained, the insertion/extraction method 100 comprises a step 107 of inserting at least one replacement optical subband SB' into the filtered optical channel $C_i^*$, as replacement for the second optical subband SB" deleted in the optical channel $C_i$, so as to obtain a modified optical channel $C_i'$ containing the optical subband SB'. The function of replacing an optical subband SB by an optical subband SB' is thus fulfilled.

This insertion step 107 may be performed with the aid of means similar to the coupling means 17 described previously, which can consist of a 50:50 coupler for example.

In an advantageous manner, the insertion/extraction method 100 comprises a prior step 101 of duplicating the optical channel $C_i$ as a plurality of duplicated optical channels, in this instance $C_i(1)$ and $C_i(2)$ in FIG. 2. This duplication step 101 may be performed with the aid of means similar to the duplication means 11 described previously, which can consist of a 50:50 coupler for example.

Once the plurality of duplicated optical channels $C_i(1)$ and $C_i(2)$ has been obtained, the extraction 103 of the first optical subband is performed by means of one of the duplicated optical channels, the channel $C_i(1)$ in this instance, and the obtaining 105 of the filtered optical channel $C_i^*$ is performed by means of another of the duplicated optical channels, the channel $C_i(2)$ in this instance.

Figure 3:
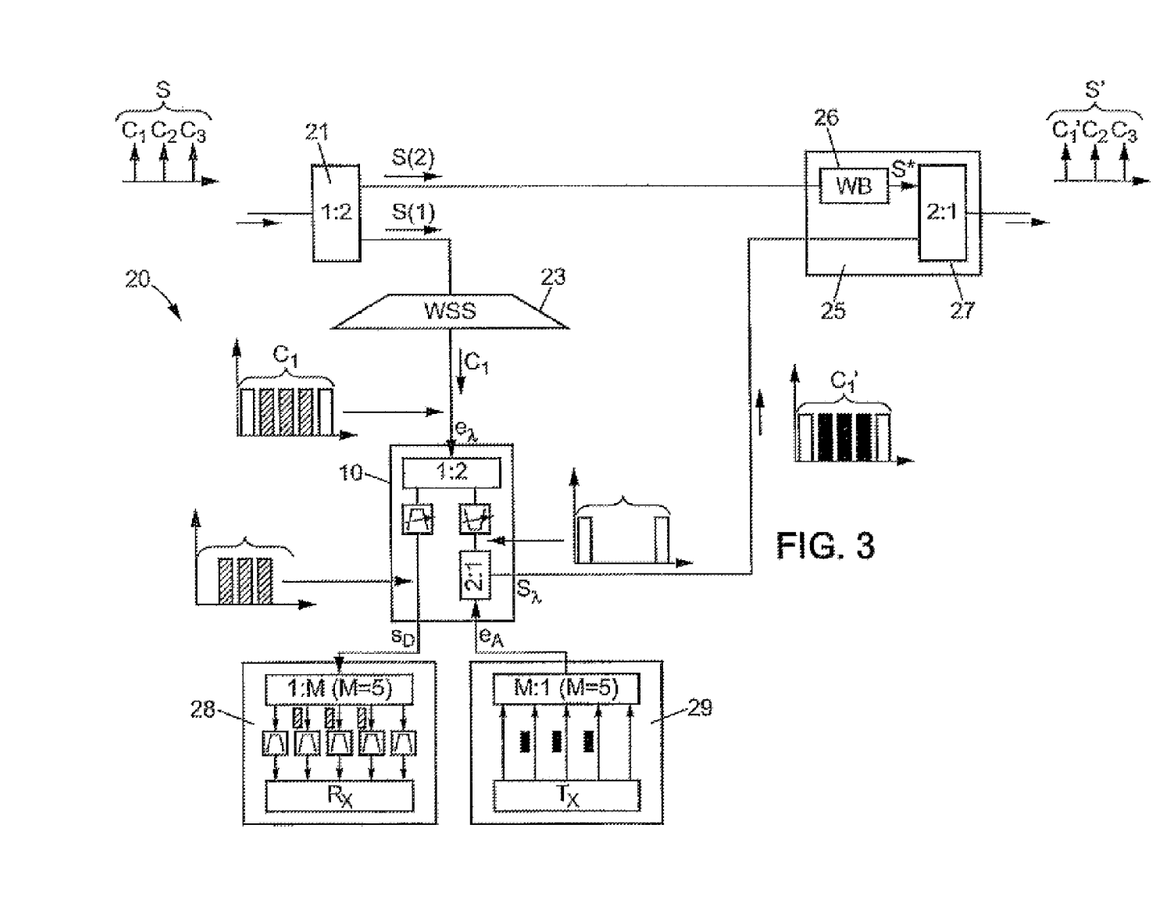
FIG. 3 schematically represents a first embodiment of an optical switch using the insertion/extraction device according to a particular embodiment of the present invention.

The extraction step 103 on the one hand, and the obtaining step 105 and insertion step 107 on the other hand, may be performed in parallel with one another or in any order. Referring now to FIG. 3 in which is illustrated an insertion/extraction optical switch 20 using the insertion/extraction device 10 illustrated in FIG. 1.

In the illustrative example of FIG. 3, the optical signal S comprises 3 wavelength-multiplexed channels $C_1, C_2, C_3$, the first optical channel C1 being composed of 5 subbands, but it is obvious that the optical signal can be composed of an arbitrary number of optical channels, and that these channels can comprise an arbitrary number of optical subbands.

The insertion/extraction optical switch comprises on the one hand a selection module 23 (or WSS for <u>W</u>avelength <u>S</u>elective <u>S</u>witch) which receives, on its input port, the optical signal S (or a copy of this optical signal S) and selects one of the optical channels multiplexed in this signal S, in this instance the optical channel $C_1$ in the example of FIG. 3, comprising at least one optical subband to be extracted and/or to be replaced, so as to provide it on its output port. Such a selection module 23 can consist of a wavelength selective switch (WSS for <u>W</u>avelength <u>S</u>elective <u>S</u>witch in English).

A wavelength selective switch such as this may be reconfigurable so as to make it possible to dispatch any of the optical channels to one of its output ports. It is in particular remotely reconfigurable by way of a switch management module making it possible to select the optical channel to be processed. Such a switch management module is similar to the management module for the device described previously.

The output port of the selection module 23 is connected to the main input port $e_\lambda$ of an insertion/extraction device 10 similar to that described in FIG. 1, so as to extract and/or to replace one or more optical subbands of the optical channel $C_1$. This device 10 makes it possible to extract at least one first optical subband of the selected optical channel $C_1$ and/or to provide a modified optical channel $C_1'$ obtained on the basis of the selected optical channel $C_1$ in which at least one replacement subband is inserted.

In order to illustrate the principle of extraction of the present invention in another way, the signal $C_1$ illustrated in FIG. 1 exhibits 5 optical subbands whose second, third and fourth optical subbands are extracted by the insertion/extraction device 10.

The extraction port of the insertion/extraction device 10 is connected to the input of an optical reception module 28, so as to provide this module 28 with the optical subband(s) extracted by the insertion/extraction device 10.

This optical reception module 28 may be composed of a demultiplexer separating the various optical subbands, each output of which is respectively connected to an optical receiver, for example a phase and polarization diversity coherent detector, dedicated to the optical subband to be received.

Such a demultiplexer can consist of a 1:n coupler which dispatches to n optical receivers the n subbands previously pre-filtered optically so as to isolate them as far as possible from their neighbors, so as to reduce the problem of "crosstalk". A filtering supplement, allowing proper reception of the optical subbands, can then be implemented at the level of the RF hardware components used in optical receiver such as a photodiode, an RF amplifier, or indeed a low-pass RF filter.

In the case where a single subband is extracted, a single optical receiver may be used. Conversely, if all the optical subbands of the signal S are extracted, n optical receivers may be used. In another advantageous embodiment where an optical receiver of coherent detector type is used to detect a plurality of optical subbands, it is possible to perform the demultiplexing in the digital domain, in which case it is advantageous to place at the input of this coherent detector a digital-analog converter exhibiting an appropriate passband and sampling speed.

The insertion port $e_A$ of the insertion/extraction device 10 is, for its part, connected to the output of an optical emission module 29, so that this module 29 can provide the insertion/extraction device 10 with the optical subband(s) to be inserted.

This optical emission module 29 may be composed of a plurality of optical emitters, each emitting an optical subband to be inserted, connected to a multiplexer which bundles the optical subbands emitted within one and the same optical insertion signal, destined for the insertion port $e_A$ of the insertion/extraction device 10. The optical reception module 28 and optical emission module 29 may be bundled within one and the same optical emitter/receiver or consist of physically separate modules as illustrated in FIG. 3.

The main output port $s_\lambda$ of the insertion/extraction device 10 is connected for its part to a second input port of substitution means 25, so as to transmit thereto the modified optical channel $C_1'$ in which the optical subbands extracted on the extraction port $s_D$ of the device 10 have been replaced with the replacement optical subbands inserted on the insertion port $e_A$ of the device 10.

The optical switch 20 thus comprises substitution means 25, connected to the insertion/extraction device 10, which serve to obtain a modified optical signal S' by replacement of the selected optical channel $C_1$ by the modified optical channel $C_1'$ obtained by the insertion/extraction device 10. These substitution means 25 therefore receive, on the one hand, the initial optical signal S by way of a first input port and, on the other hand, the modified optical channel $C_1'$ by way of the second input port.

In an advantageous embodiment, the insertion/extraction optical switch 20 advantageously comprises a duplication means 21 making it possible to duplicate the optical signal S on at least one first and one second output port, the first output port being connected to the selection module 23 so as to provide it with a first duplicated optical signal S(1) and the second output port being connected to the substitution means 25 so as to provide the latter with a second duplicated optical signal S(2).

In this embodiment, the substitution means 25 can advantageously comprise a wavelength blocking module 26 (WB for "Wavelength Blocker" in English), connected to the first input port of the substitution means 25, as well as a coupling means 27, one input port of which is connected to the output of the blocking module 26 while the other input port is connected to the second input port of the substitution means 25.

Thus, the blocking module 26 receives the initial optical signal S and deletes, from this optical signal S, the optical channel $C_1$ which is selected by the selection module 23. It thus delivers, as output and destined for the coupling means 27, a modified optical signal comprising all the optical channels of the signal S with the exception of the optical channel $C_1$.

In a particular embodiment, the blocking module 26 is remotely reconfigurable by way of the switch management module described previously, which can instruct the blocking module 26 to delete the optical channel selected moreover by the selection module 23 so as to undertake the replacement of this optical channel $C_1$ in the optical signal S.

The coupling means 27 thus receives the modified optical signal S*, corresponding to the optical signal S without the optical channel $C_1$, as well as the modified optical channel $C_1'$ and bundles them within one and the same output optical signal S', composed of the wavelength-multiplexed optical channels $C_1'$, $C_2$ and $C_3$.

The output optical signal S' obtained with the optical switch 20 thus corresponds to the input optical signal S in which at least one of the optical subbands making up one of the optical channels of the signal S has been extracted and replaced.

Figure 4:
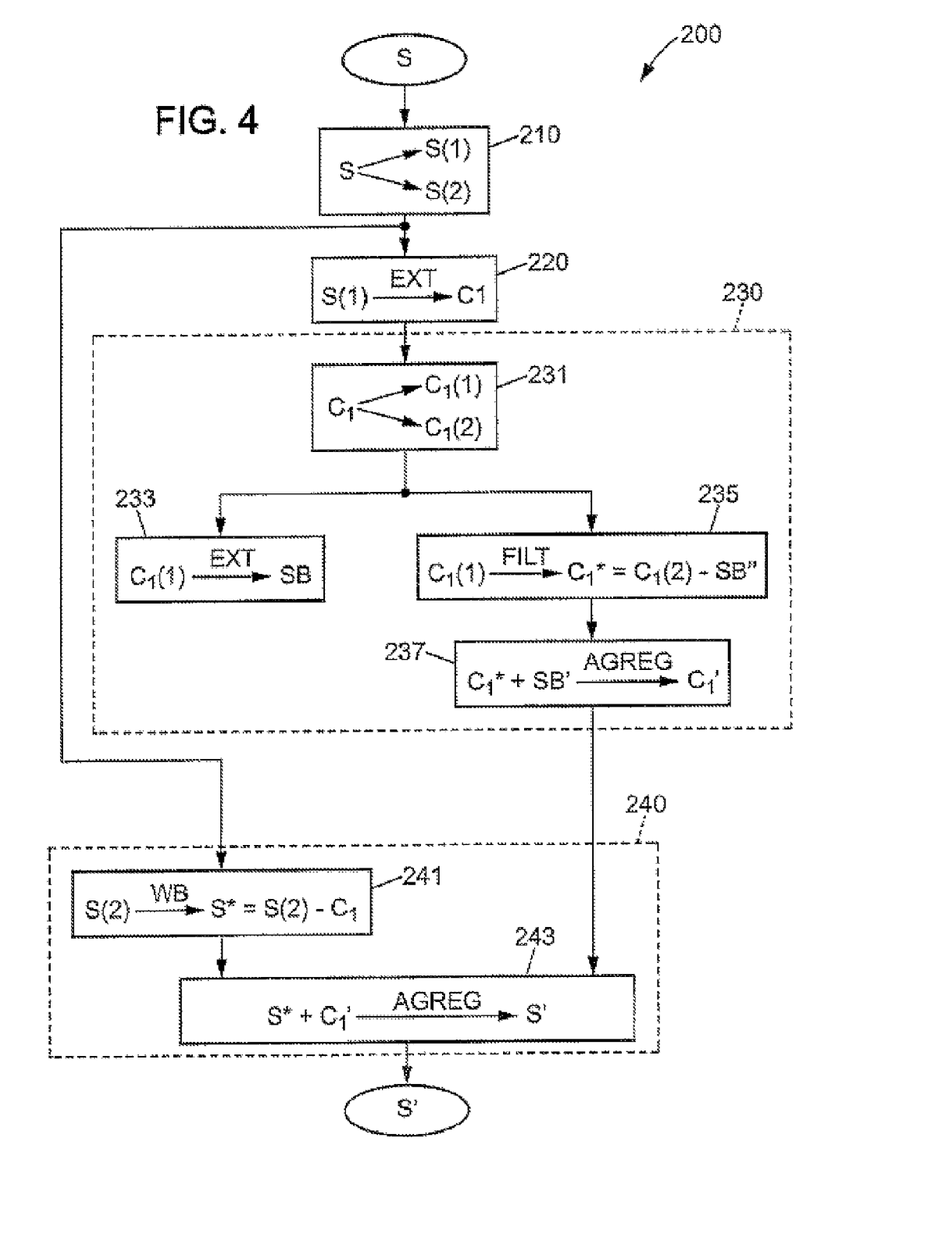
FIG. 4 illustrates the steps of a method of inserting/extracting at least one optical subband into/from a multiplexed optical channel in an optical signal according to a particular embodiment of the present invention.

Referring now to FIG. 4 in which are illustrated the steps of a method 200 for inserting/extracting one or more optical subband(s) into/from an optical signal composed of a plurality of optical channels according to the present invention, it being possible for these steps to advantageously be performed by means of the optical switch of FIG. 3.

Here, the insertion/extraction method 200 is applied to the extraction and/or to the replacement of an optical subband in an optical channel $C_1$ comprising a plurality of optical subbands, for example frequency multiplexed according to the OFDM technique, this optical signal $C_1$ being wavelength-multiplexed with other similar optical channels, optionally also comprising a plurality of optical subbands multiplexed for example according to the OFDM technique, within an optical signal S.

The insertion/extraction method 200 comprises, on the one hand, the extraction 220 of the optical channel $C_1$, in which the optical subband to be extracted and/or replaced is situated, from the optical signal S or a copy of this optical signal S. This selection step 220 may be performed with the aid of means similar to the selection module 23 described previously.

Once the optical channel $C_1$ containing the optical subband to be extracted and/or replaced has been extracted, the context of the insertion/extraction method 100 illustrated in FIG. 2 holds.

The method 200 therefore then comprises a step 230 of applying the insertion/extraction method 100 such as described previously to the extracted optical channel $C_1$, so as to extract at least one first optical subband of this extracted optical channel and/or to obtain at least one modified optical channel $C_1'$, on the basis of this extracted optical channel in which at least one replacement optical subband is inserted in place of at least one second optical subband to be deleted.

Thus, this replacement step 230 comprises:
  a first sub-step 231 of duplicating the optical channel $C_i$ as a plurality of duplicated optical channels $C_1(1)$ and $C_1(2)$, similarly to step 101 described previously;
  optionally a sub-step 233 of extracting, on the basis of at least one of the duplicated optical channels, in this instance $C_1(1)$ in FIG. 4, the optical subband to be extracted and/or replaced, similarly to step 103 described previously, if it is desired to extract this subband so as to receive the data that it contains;
  a sub-step 235 of obtaining, from another of the duplicated optical channels different from the duplicated optical channel used for the extraction 113 (in this instance $C_1(2)$ in FIG. 4), a filtered optical channel $C_1^*$ in which the optical subband to be replaced is deleted, similarly to step 105 described previously; and once the filtered optical channel $C_1^*$ has been obtained, a sub-step 237 of inserting a replacement optical subband SB' into the filtered optical channel $C_1^*$, so as to obtain a modified optical channel $C_1'$.

Once this replacement operation has been performed and the modified optical channel $C_i'$ has been obtained, a step 240 of obtaining a modified optical signal S' is performed, during which the modified optical signal S' is obtained by replacing, in the optical signal S or a copy of the latter, the optical channel $C_1$ extracted by the modified optical channel $C_1'$.

In an advantageous embodiment, the insertion/extraction method 200 comprises a step 210 of prior duplication of the optical signal S as at least one first and one second duplicated optical signal S(1) and S(2). In this case, the extraction 220 of the optical channel $C_1$ is performed by using the first duplicated optical signal S(1) and the obtaining 240 of the modified optical signal S' uses the second duplicated optical signal S(2).

In this embodiment, step 240 of the modified optical signal can comprise a first sub-step 241 of obtaining a filtered optical signal S*, on the basis of the second duplicated optical signal S(2) in which the extracted optical channel $C_1$ is deleted.

Step 240 of the modified optical signal then also comprises a second sub-step 243 of aggregation 243 of the filtered optical signal S* with the modified optical channel $C_1'$ obtained during the insertion sub-step 237, so as to obtain the modified optical signal S' in which an optical subband has indeed been replaced with a replacement subband.

The insertion/extraction method 200 thus allows the extraction and/or the replacement of one or more optical subband(s) situated in an optical channel wavelength-multiplexed with other optical channels within an optical signal, for example of WDM type.

Figure 5:
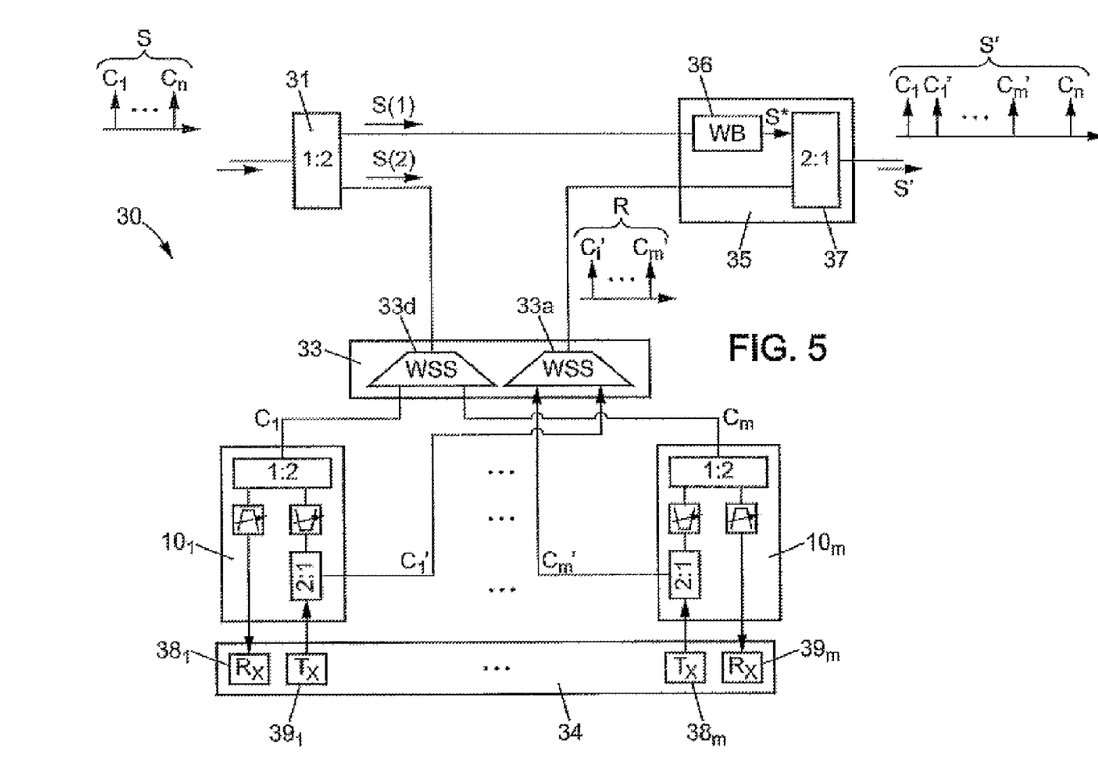
FIG. 5 schematically represents a second embodiment of an optical switch using the insertion/extraction device according to a particular embodiment of the present invention.

Referring now to FIG. 5 in which is illustrated an optical switch 30 using the insertion/extraction device 10 illustrated in FIG. 1 according to an advantageous embodiment of the invention.

The optical switch 30 is composed in a similar way to the optical switch 20, in the sense that it comprises a duplication means 31 similar to the duplication means 21 and similar substitution means 35 similar to the substitution means 25.

The optical switch 30 also comprises a selection module 33 connected to one of the duplication ports of the duplication means 31, so as to receive an optical signal S composed of n wavelength-multiplexed optical channels $C_1, \ldots, C_n$.

This selection module 33 is distinguished however from the selection module 23 in that it comprises a unit 33d for deaggregating the optical channels exhibiting a number m of output ports (where 2≤m≤n) on which are respectively dispatched one of the optical channels $C_1, \ldots, C_n$ comprising at least one optical subband to be extracted and/or replaced. Such a deaggregation unit 33d can consist of a WDM demultiplexer, for example.

Each output port of the unit 33d for deaggregating the optical channels is connected respectively to the main input port of an insertion/extraction device associated with the optical channel provided on this output port, so that the deaggregation unit 33d is connected to m insertion/extraction devices $10_1, \ldots, 10_m$. For convenience, only the first device $10_1$ and the last device $10_m$ are represented in FIG. 5.

Each of the insertion/extraction devices $10i$ (where 1≤i≤m) is connected to an optical reception module 38, by its extraction port $s_D$, as well as to an optical emission module 39, by its insertion port, similarly to what is described in FIG. 3. The various pairs of reception 38i and emission 39i modules may be bundled within an optical emission/reception unit 34, so as to mutualize the management of the electrical power supply resources for the optoelectronic components constituting these various modules.

The selection module 33 is also distinguished in that it comprises a unit 33a for aggregating the optical channels exhibiting a number m of input ports. Each of these m input ports is connected respectively to the main output port of one of the insertion/extraction devices $10_1, \ldots, 10_m$, so that the aggregation unit 33a receives a plurality of modified signals $C_1', \ldots, C_m'$ arising from m optical channels selected from among the channels $C_1$-$C_n$ and processed respectively by the insertion/extraction devices $10_1, \ldots, 10_m$.

This aggregation unit 33a will aggregate the modified optical channels C1', . . . ,Cm' within one and the same aggregated channel optical signal and transmit this aggregated optical signal R to the second input port of the substitution means 35.

Similarly to what is done in FIG. 3, the blocking module 36 of the substitution means 35 receives one of the duplicated optical signals, S(1) in this instance, and deletes, from this optical signal S(1), the optical channels selected by the deaggregation unit 33d of the selection module 33. This blocking module 36 thus delivers, as output and destined for the coupling means 37, a filtered optical signal S* comprising all the optical channels of the input optical signal S with the exception of the selected optical channels.

The coupling means 37 thus receives the filtered optical signal S*, corresponding to the input optical signal S without the selected optical channels, on its first input port, as well as an aggregated optical signal R in which the modified optical channels C1'-Cm' are aggregated, on its second input port, and couples them so as to provide a modified optical signal S' composed of n wavelength-multiplexed optical channels including the m modified optical channels C1'-Cm'.

The output optical signal S' obtained with the optical switch 30 thus corresponds to the input optical signal S in which optical subbands belonging to several of the optical channels of the signal S have been extracted and/or replaced.

With this optical switch 30, it is thus possible to extract and/or replace optical subbands belonging to various channels wavelength-multiplexed within one and the same optical signal.

Figure 6:
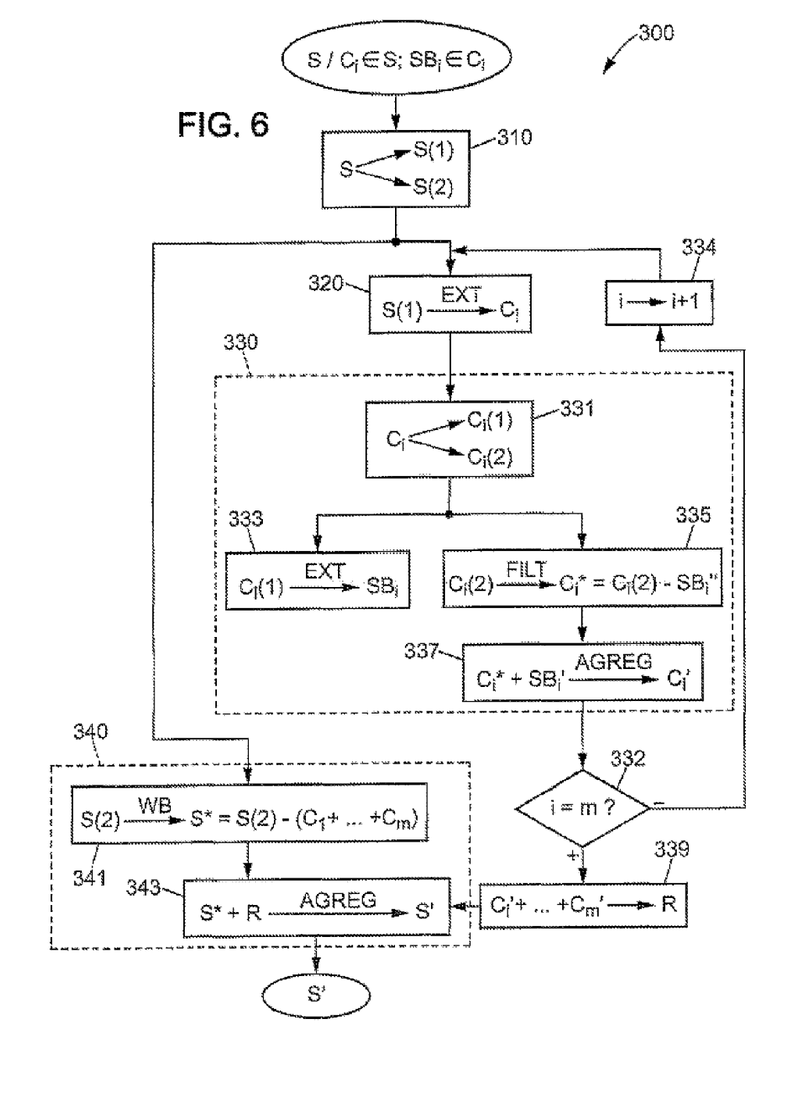
FIG. 6 illustrates the steps of a method of inserting/extracting several optical subbands belonging to various optical channels multiplexed in one and the same optical signal according to a particular embodiment of the present invention.

Referring now to FIG. 6 in which are illustrated the steps of a method 300 of inserting/extracting optical subbands belonging to a plurality of multiplexed optical channels within an optical signal S according to the present invention, it being possible for these steps to advantageously be performed by means of the optical switch 30 of FIG. 5.

This insertion/extraction method 300 corresponds in essence to the insertion/extraction method 200 described previously and whose steps are illustrated in FIG. 4. It is, however, distinguished therefrom by an additional iteration loop making it possible to extract one or more subband(s) within a plurality of optical channels whilst the replacement method 200 related to the processing of a single optical channel.

The insertion/extraction method 300 therefore comprises a first step 310 of duplicating the optical signal S as a plurality of duplicated optical signals, S(1) and S(2) in this instance, similarly to step 210 described previously.

Once the plurality of duplicated optical signals has been obtained, the method 300 successively comprises, for a number m of optical channels to be processed, with a variable i ranging from 1 to m:

the selection (step 320) of a first optical channel $C_i$ in which there is (or are) an (or several) optical subband(s) $SB_i$ to be extracted and/or replaced, on the basis of a first of the duplicated optical signals S(1), similarly to step 220 described previously.

the application (step 330) of the insertion/extraction method 100 such as described previously to the optical subband $SB_i$, in the selected optical channel $C_i$ corresponding to the replacement step 230 previously described and comprising the following sub-steps:

a first sub-step 331 of duplicating the optical channel $C_i$ as a plurality of duplicated optical channels $C_i(1)$ and $C_i(2)$, similarly to step 231 described previously;

optionally a sub-step 333 of extracting, from at least one of the duplicated optical channels, in this instance $C_i(1)$ in FIG. 6, the optical subband $SB_i$ to be extracted and/or replaced, similarly to step 233 described previously, if it is desired to extract this subband so as to receive the data that it contains;

a sub-step 335 of obtaining, from another of the duplicated optical channels different from the duplicated optical channel used for the extraction 113 (in this instance $C_i(2)$ in FIG. 6), a filtered optical channel $C_i^*$ in which the optical subband $SB_i$ to be replaced is deleted, similarly to step 235 described previously; and once the filtered optical channel $C_i^*$ has been obtained, a sub-step 337 of inserting a replacement optical subband $SB_i'$ into the filtered optical channel $C_i^*$, so as to obtain a modified optical channel $C_i'$, similarly to step 237 described previously.

Once this replacement operation 330 has been performed for a modified optical channel $C_i'$ obtained, the selection 320 and replacement 330 steps are performed again for each optical channel $C_i$ containing an (or several) optical subband(s) to be extracted and/or replaced.

Once the m modified optical channels $C_1^*, \ldots, C_i^*, \ldots, C_m^*$ have been obtained, the latter are aggregated within one and the same aggregated optical signal R in the course of an aggregation step 339.

The replacement method 300 then comprises a step 340 of obtaining a modified optical signal S' comprising a first sub-step 341 of obtaining a filtered optical signal S*, on the basis of a second duplicated optical signal S(2), similarly to step 241 described previously, in which the optical channels $C_1, \ldots, C_m$ selected comprising the optical subbands $SB_i$ to be extracted and/or replaced are deleted.

Step 340 of obtaining a modified optical signal also comprises a second sub-step 343 of aggregating the filtered optical signal S*, obtained during the sub-step 341, with the aggregated optical signal R, obtained during the aggregation step 339, so as to obtain a modified optical signal S' in which the optical subbands $SB_i$ have indeed been replaced with optical subbands $SB_i'$.

The insertion/extraction method 300 thus allows the extraction and/or the replacement of several optical subbands situated in various optical channels wavelength-multiplexed with other optical channels within one and the same optical signal.

Figure 7:
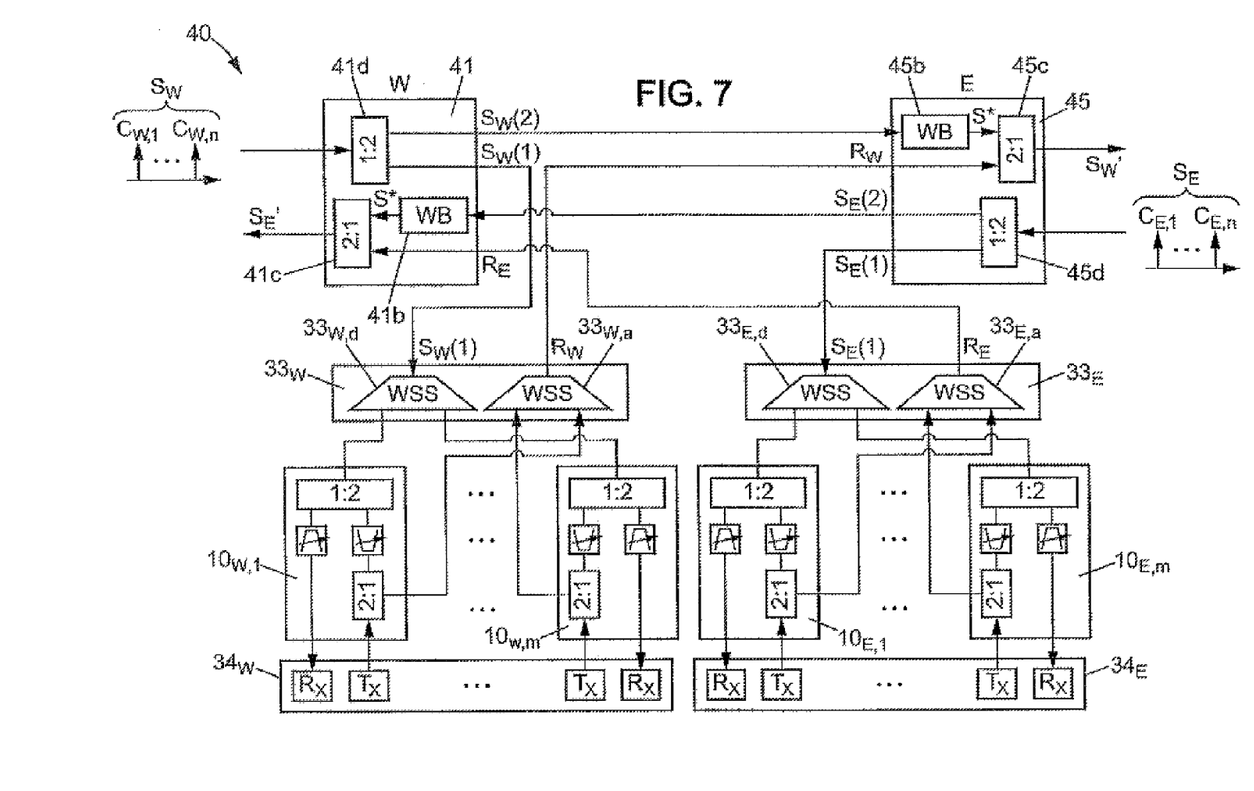
FIG. 7 schematically represents a third bidirectional embodiment of an optical switch using the insertion/extraction device according to a particular embodiment of the present invention.

Referring now to FIG. 7 in which is illustrated an optical switch 40 using the insertion/extraction device 10 illustrated in FIG. 1 according to another advantageous embodiment of the invention.

This optical switch 40 corresponds to a bidirectional implementation of the optical switch 30 illustrated in FIG. 5.

Accordingly, the optical switch comprises rearrangement means 41 and 45 associated respectively with one of the two possible directions of transmission.

The first rearrangement means 41 exhibit the functions of the duplication means 31 according to FIG. 5 for an optical signal $S_W$ traveling in the West-East direction as well as the functions of the substitution means 35 according to FIG. 5 for an optical signal $S_E$ traveling in the East-West direction.

The first rearrangement means 41 therefore comprise a duplication means 41d for duplicating the optical signal $S_W$ at input, similar to the duplication means 31. The first rearrangement means 41 also comprise a blocking module 41b blocking certain optical channels selected from the optical signal $S_E$, similar to the blocking module 36 of FIG. 5. The first rearrangement means 41 finally comprise a coupling means 41c aggregating an optical signal $S_E^*$ filtered by the blocking module 36 with a modified optical signal $R_E$ composed of the optical channels selected from the optical signal $S_E$ and for which optical subbands are extracted and/or replaced.

In a symmetric manner, the second rearrangement means 45 exhibit the functions of the duplication means 31 according to FIG. 5 for an optical signal $S_E$ traveling in the East-West direction as well as the functions of the substitution means 35 according to FIG. 5 for an optical signal $S_W$ traveling in the West-East direction.

These second rearrangement means 45 therefore comprise a duplication means 45d for duplicating the optical signal $S_E$ at input, similar to the duplication means 31 of FIG. 5. The second rearrangement means 45 also comprise a blocking module 45b blocking certain optical channels selected from the optical signal $S_W$, similar to the blocking module 36 of FIG. 5. The second rearrangement means 45 finally comprise a coupling means 45c aggregating an optical signal $S_W^*$ filtered by the blocking module 36 with a modified optical signal $R_W$ composed of the optical channels selected from the optical signal $S_W$ and for which optical subbands are extracted and/or replaced.

As regards the West-East direction, the optical switch 40 comprises a selection module $33_W$, similar to the selection module 33 of FIG. 5, which comprises an optical channels deaggregation unit similar to the deaggregation unit 33d of FIG. 5, whose input port is connected to one of the two output ports of the duplication means 41d so as to receive the duplicated optical signal $S_W(1)$ and which exhibits a number m' of output ports.

Each output port of this deaggregation unit is connected respectively to the main input port of an insertion/extraction device associated with the optical channel provided on this output port, so that this deaggregation unit is connected to m' insertion/extraction devices $10_{W,1}, \ldots, 10_{W,m'}$ similar to the insertion/extraction device 10. For convenience, only the first device $10_{W,1}$ and the last device from among these m' devices, are represented in FIG. 7.

Each of the m' insertion/extraction devices $10_{W,1}$-$10_{W,m'}$ connected to one of the output ports of the deaggregation unit is connected to an optical reception module by its extraction port $s_D$, as well as to an optical emission module by its insertion port, similarly to what is described in FIG. 5. The various pairs of reception and emission modules may be bundled within an optical emission/reception unit $34_W$, similarly to FIG. 5.

The selection module $33_W$ also comprises an optical channels aggregation unit $33_{W,a}$, similar to the aggregation unit 33a of FIG. 5, which exhibits a number m' of input ports. Each of these m' input ports is connected respectively to the main output port $s_\lambda$ of one of the insertion/extraction devices $10_{W,i}$ so that the aggregation unit $33_{W,a}$ receives a plurality of modified optical channels $C_{W,1}', \ldots, C_{W,m}'$ arising from m' optical channels selected from among the channels $C_{W,1}, \ldots, C_{W,n}$ of the signal $S_W$ and processed respectively by the insertion/extraction devices $10_{W,i}$.

This aggregation unit $33_{W,a}$ will bundle the modified optical channels $C_{W,1}', \ldots, C_{W,m}'$ within one and the same optical signal $R_W$ of modified channels and transmit this aggregated signal $R_W$ to the second input port of the coupling means 45c belonging to the rearrangement means 45.

The output optical signal $S_W'$, obtained as output from the coupling means 45 by aggregation of the optical signal $S_W$ filtered by the blocking module 45b with the aggregated signal $R_W$, thus corresponds to the optical signal $S_W$ in which optical subbands belonging to several of the optical channels of the signal $S_W$ have been extracted and/or replaced.

In a symmetric manner, as regards the East-West direction, the optical switch 40 comprises a selection module $33_E$, similar to the selection module 33 of FIG. 5, which comprises an optical channels deaggregation unit $33_{E,d}$ similar to the deaggregation unit 33d of FIG. 5, whose input port is connected to one of the two output ports of the duplication means 45d, so as to receive the optical signal $S_E$, and which exhibits a number m' of output ports.

Each output port of this deaggregation unit $33_{E,d}$ is connected respectively to the main input port $e_\lambda$ of an insertion/extraction device $10_{E,i}$ associated with the optical channel $C_{E,i}$ provided on this output port, so that this deaggregation unit is connected to m' insertion/extraction devices $10_{E,1}, \ldots, 10_{E,m'}$ similar to the insertion/extraction device 10. Still for convenience, only the first device $10_{E,1}$ and the last device $10_{E,m'}$, from among these m' devices, are represented in FIG. 7.

Each of the m' insertion/extraction devices $10_{E,1}$-$10_{E,m'}$, connected to one of the output ports of the deaggregation unit $33_{E,d}$ is connected to an optical reception module by its extraction port $s_D$, as well as to an optical emission module by its insertion port, similarly to what is described in FIG. 5. The various pairs of reception and emission modules may be bundled within an optical emission/reception unit $34_E$, similarly to FIG. 4.

The selection module $33_E$ also comprises an optical channels aggregation unit $33_{E,a}$, similar to the aggregation unit 33a of FIG. 4, which exhibits a number m' of input ports. Each of these m input ports is connected respectively to the main output port $s_\lambda$ of one of the insertion/extraction devices $10_{E,i}$ so that the aggregation unit $33_{E,a}$ receives a plurality of modified optical channels $C_{E,1}', \ldots, C_{E,m'}'$ arising from m' optical channels selected from among the channels $C_{E,1}, \ldots, C_{E,n}$ of the signal $S_E$ and processed respectively by the insertion/extraction devices $10_{E,i}$.

This aggregation unit $33_{E,a}$ will bundle the modified optical channels $C_{E,1}', \ldots, C_{E,m'}'$ within one and the same optical signal $R_E$ of modified channels and transmit this aggregated signal $R_E$ to the second input port of the coupling means 41c belonging to the second rearrangement means 45.

The output optical signal $S_E'$, obtained as output from the coupling means 41 by aggregation of the optical signal $S_E^*$ filtered by the blocking module 41b with the aggregated signal $R_E$, thus corresponds to the optical signal $S_E$ in which optical subbands belonging to several of the optical channels of the signal $S_E$ have been extracted and/or replaced.

The optical switch 40 is therefore equally capable of processing the multiplexed optical signals both in the East-West direction and in the West-East direction. This optical switch 40 is consequently insensitive to the direction of transmission (it is said to be "directionless").

Of course, the invention is not limited to the exemplary embodiments hereinabove described and represented, on the basis of which it will be possible to envisage other modes and other embodiments, without however departing from the scope of the invention.

The invention claimed is:

1. A device for inserting/extracting at least one optical subband into/from an optical channel composed of a plurality of multiplexed optical subbands that are orthogonally frequency-multiplexed, the device comprising:
    a duplication means able to duplicate the optical channel to a first duplication port and a second duplication port;
    extraction means able to extract a first multiplexed optical subband belonging to the optical channel, consisting of bandpass filtering means connected to the first duplication port so as to receive a first duplicated optical channel and devised so as to let through, to an extraction port, the first multiplexed optical subband of the first duplicated optical channel;
    deletion means devised so as to obtain a filtered optical channel on the basis of the optical channel in which at least one multiplexed second subband is deleted, consisting of bandstop filtering means connected to the second duplication port so as to receive a second duplicated optical channel and devised so as to filter the second subband in said second duplicated optical channel so as to obtain the filtered optical channel;
    a coupling means able to insert a replacement optical subband in place of the second subband into the filtered optical channel so as to obtain a modified optical channel;
wherein the width of the spectral passband of the bandpass filtering means and/or of the spectral band rejected by the bandstop filtering means lies in a frequency band ranging from a lower frequency greater than or equal to 7 GHz to a higher frequency strictly less than 10 GHz.

2. The insertion/extraction device as claimed in claim 1, wherein the width of the spectral passband of the bandpass filtering means and/or of the spectral band rejected by the bandstop filtering means is adjustable.

3. The insertion/extraction device as claimed in claim 1, wherein the central frequency of the spectral passband of the bandpass filtering means and/or of the spectral band rejected by the bandstop filtering means is tunable.

4. The insertion/extraction device as claimed in claim 1, wherein the multiplexed optical subbands of the optical channel comprise at least two orthogonally frequency-multiplexed optical signals.

5. The insertion/extraction device as claimed in claim 1, comprising a device management module, connected to the bandpass filtering means and to the bandstop filtering means, said device management module being devised so as to adjust the spectral passband of the bandpass filtering means and the spectral band rejected by the bandstop filtering means and to tune the central frequency of the spectral passband of the bandpass filtering means and of the spectral band rejected by the bandstop filtering means.

6. An optical switch for inserting/extracting at least one multiplexed optical subband belonging to at least one optical channel composed of a plurality of multiplexed optical subbands that are orthogonally frequency-multiplexed, included in an optical signal comprising a plurality of wavelength-multiplexed optical channels, said optical switch comprising:
    a selection module able to select at least one optical channel comprising at least one multiplexed optical subband to be extracted and/or to be replaced from among the multiplexed optical channels of the optical signal;
    at least one insertion/extraction device as claimed in claim 1, connected to the selection module and devised so as to extract at least one first multiplexed optical subband of the selected optical channel and/or to provide a modified optical channel obtained on the basis of the selected optical channel into which at least one replacement multiplexed optical subband is inserted;

substitution means, connected to the insertion/extraction device and devised so as to obtain a modified optical signal by replacement of the at least one selected optical channel by the at least one modified optical channel.

7. The insertion/extraction optical switch as claimed in claim 6, further comprising a duplication means devised so as to duplicate the optical signal on at least one first and one second output port, the first output port being connected to the selection module so as to provide it with a first duplicated optical signal and the second output port being connected to the substitution means so as to provide them with a second duplicated optical signal, the substitution means comprising:

a blocking module devised so as to receive the second duplicated optical signal and to provide as output a filtered optical signal in which the at least one selected optical channel is deleted; and a coupling means devised so as to couple the filtered optical signal and the at least one modified optical channel in order to obtain the modified optical signal.

8. The insertion/extraction optical switch as claimed in claim 7, comprising a switch management module connected to the selection module and to the blocking module, said switch management module being devised so as to control the selection module and the blocking module so as respectively to select and delete the at least one optical channel.

9. The insertion/extraction optical switch for inserting/extracting at least one optical subband belonging to at least one optical channel composed of a plurality of multiplexed optical subbands that are orthogonally frequency-multiplexed, included in an optical signal comprising a plurality of wavelength-multiplexed optical channels, said optical switch comprising:

a selection module able to select at least one optical channel comprising at least one multiplexed optical subband to be extracted and/or to be replaced from among the multiplexed optical channels of the optical signal, wherein said switch comprises a plurality of insertion/extraction devices as claimed in claim 1, connected to the selection module and devised so as to extract at least one first multiplexed optical subband of the selected optical channel and/or to provide a modified optical channel obtained on the basis of the selected optical channel into which at least one replacement multiplexed optical subband is inserted;

substitution means, connected to the insertion/extraction device and devised so as to obtain a modified optical signal by replacement of the at least one selected optical channel by the at least one modified optical channel, wherein the selection module comprises:

a deaggregation unit devised so as to transmit a plurality of selected optical channels, each comprising at least one multiplexed optical subband to be extracted and/or replaced, respectively to each of the insertion/extraction devices; and an aggregation unit devised so as to aggregate the modified optical channels obtained respectively by each of the insertion/extraction devices into an aggregated optical signal transmitted to the substitution means.

10. A method of inserting/extracting at least one optical subband into/from an optical channel comprising a plurality of multiplexed optical subbands that are orthogonally frequency-multiplexed, said method comprising:

the duplication of the optical channel as a plurality of duplicated optical channels;

the extraction of at least one first multiplexed optical subband from one of the duplicated optical channels by bandpass filtering means devised so as to let through the first multiplexed optical subband of the duplicated optical channel;

the obtaining of a filtered optical channel on the basis of one of the duplicated optical channels in which at least one second multiplexed optical subband is deleted by bandstop filtering means devised so as to filter the second multiplexed subband in said duplicated optical channel so as to obtain the filtered optical channel; and the insertion of at least one replacement multiplexed optical subband into the filtered optical channel, as replacement for the second multiplexed optical subband, so as to obtain a modified optical channel, wherein the width of the spectral passband of the bandpass filtering means and/or of the spectral band rejected by the bandstop filtering means lies in a frequency band ranging from a lower frequency greater than or equal to 7 GHz to an upper frequency strictly less than 10 GHz.

11. A method of inserting/extracting at least one optical subband into/from an optical signal comprising a plurality of wavelength-multiplexed optical channels, at least one of said optical channels comprising a plurality of multiplexed optical subbands that are orthogonally frequency-multiplexed, said method comprising:

the extraction of at least one of said optical channels comprising at least one multiplexed optical subband to be extracted and/or to be replaced;

the application of the insertion/extraction method as claimed in claim 10 to the extracted optical channel, so as to extract at least one first multiplexed optical subband of the extracted optical channel and/or to obtain at least one modified optical channel on the basis of the extracted optical channel in which at least one replacement multiplexed optical subband is inserted in place of at least one second multiplexed optical subband;

the obtaining of a modified optical signal on the basis of the optical signal in which the extracted optical channel is replaced with the modified optical channel.

12. The insertion/extraction method as claimed in claim 11, comprising a prior duplication of the optical signal as at least one first and one second duplicated optical signal, the extraction of the optical channel being done on the basis of the first duplicated optical signal, and wherein the step of obtaining the modified optical signal comprises:

the obtaining of a filtered optical signal on the basis of the second duplicated optical signal in which the second multiplexed optical subband is deleted; and the aggregation of the filtered optical signal with the at least one modified optical channel in order to obtain the modified optical signal.

13. The insertion/extraction method as claimed in claim 11, in which a plurality of multiplexed optical subbands included in a plurality of selected optical channels are to be extracted and/or replaced, wherein:

the application of the insertion/extraction method is performed for each of said selected optical channels so as to obtain a plurality of modified optical channels into which at least one replacement multiplexed optical subband is inserted;

the plurality of modified optical channels is aggregated as an aggregated optical signal before the obtaining of the modified optical signal; and the aggregation step comprises the aggregation of the filtered optical signal with the aggregated optical signal in order to obtain the modified optical signal.

* * * * *